UNITED STATES PATENT OFFICE.

EMIL REBER, OF BASEL, SWITZERLAND, ASSIGNOR TO SOCIETY OF CHEMICAL INDUSTRY IN BASLE, OF BASEL, SWITZERLAND.

MONOAZO DYESTUFFS OF THE PYRAZOLONE SERIES ABLE TO BE CHROMATED AND PROCESS OF MAKING SAME.

1,270,325. Specification of Letters Patent. Patented June 25, 1918.

No Drawing. Application filed September 11, 1917. Serial No. 190,720.

*To all whom it may concern:*

Be it known that I, EMIL REBER, chemist, a citizen of the Swiss Republic, and resident of Basel, Switzerland, have invented new and useful Monoazo Dyestuffs of the Pyrazolone Series Able to be Chromated and Process of Making Same, of which the following is a full, clear, and exact specification.

In the U. S. Letters Patent No. 1210808 is described a process for the manufacture of monoazodyestuffs of the pyrazolone series, able to be chromated, consisting in combining the diazoderivative of orthoaminophenol or of aminonaphthols or of their derivatives with pyrazolone derivatives of the benzene or the naphthalene series containing a hydroxyl group in the aryl radical.

I have now found that monoazodyestuffs of the pyrazolone series capable of being chromated, can also be obtained by combining the diazoderivative of the anthranilic acid or of its derivatives with the said pyrazolone derivatives. The new dyestuffs thus obtained are distinguished from those of the above specified U. S. Letters Patent by their more yellow tints.

The sodium salt of the new dystuffs are yellow to orange-brown powders soluble in water with greenish-yellow to orange-yellow coloration. They are insoluble or difficultly soluble in alcohol and soluble in concentrated sulfuric acid with greenish-yellow to orange-red coloration. They dye wool in an acid bath yellow to orange tints. The subsequently chromated tints are yellow, orange to red-brown and are fast to light, fulling and potting.

The process is illustrated by the following examples:

Example 1: A solution of the diazoderivative of 13.7 parts of anthranilic acid and a solution of 31.5 parts of 1-(5'-sulfo-3'-carboxy-2'-oxy)-phenyl-3-methyl-5-pyrazolone (prepared by the condensation of 5-sulfo-3-carboxy-2-oxy-1-hydrazinobenzene with acetoacetic ether) made alkaline by sodium carbonate are poured together. The yellow monoazodyestuff thus produced is separated in the usual manner by addition of common salt. It constitutes in a dry state an orange-yellow powder, dyes wool in an acid bath gold-yellow tints turning, when subsequently chromated, to a light brownish-yellow fast to fulling and to potting.

Example 2: By substituting in the foregoing Example 1 for the pyrazolone derivative indicated 32 parts of the pyrazolone of the 2-amino-5-oxy-naphthalene-7-sulfonic acid, an orange-red dyestuff is obtained which dyes wool in an acid bath bright orange tints turning, when subsequently chromated, to a red-brown fast to fulling, light and potting.

Example 3: The diazosolution derived from 17.1 parts of chloroanthranilic acid ($NH_2$:COOH:Cl=1:2:4) is added to a solution of 30.5 parts of 1 (5'-chlor-3'-sulfo-2'-oxy)-phenyl-3-methyl-5-pyrazolone (obtained by condensation of 5-chlor-3-sulfo-2-oxy-1-hydrazinobenzene with acetoacetic ether) made alkaline by sodium carbonate. The combination achieved, the dyestuff is separated by addition of common salt in the form of a yellow precipitate. It dyes wool in an acid bath yellow tints turning, when subsequently chromated, to a deep yellow fast to fulling, light and potting.

Example 4: 21 parts of sulfoanchranilic acid ($NH_2$:COOH:$SO_3H$=1:2:5) are diazotized in the usual manner and the resulting diazoderivative is poured in a solution of 23.5 parts of 1-(5'-nitro-2'-oxy)-phenyl-3-methyl-5-pyrazolone made alkaline by sodium carbonate.

The dyestuff separated in the usual manner, after the combination is achieved, constitutes in a dry state an orange-brown powder and dyes wool in an acid bath yellow pure tints turning, when subsequently chromated, to a brownish yellow fast to light, fulling and potting.

A similar dystuff of excellent fastness to fulling and potting is obtained, if in the foregoing example 23.4 parts of 1-(4'-oxy-3'-carboxy)-phenyl-3-methyl-5-pyrazolone are employed instead of the 23.5 parts of 1-(5'-nitro-2'-oxy)-phenyl-3-methyl-5-pyrazolone.

What I claim is:

1. The herein described process for the manufacture of monoazodyestuffs of the pyrazolone series consisting in combining the diazoderivative of an anthranilic compound with an oxyaryl substituted pyrazolone.

2. As new products, the herein described monoazodyestuffs of the pyrazolone series, being combination products of diazoderivatives of anthranilic compounds with oxyaryl substituted pyrazolones and the sodium salts of which constitute yellow to orange-brown powders, soluble in water with greenish-yellow to orange-yellow coloration and difficulty soluble to insoluble in alcohol and soluble in concentrated sulfuric acid with greenish-yellow to orange-red coloration and dyeing wool in an acid bath yellow to orange tints turning, when subsequently chromated, to yellow, orange and red-brown tints fast to light, fulling and potting.

3. As a new article of manufacture, the herein described dyestuff being the combination product of the diazoderivative of anthranilic acid with 1-(5'-sulfo-3'-carboxy-2'-oxy)-phenyl-3-methyl-5-pyrazolone, forming a sodium salt which constitutes a yellow-brown powder, soluble in water to a greenish yellow solution, somewhat difficultly soluble in alcohol and soluble in concentrated sulfuric acid to a greenish yellow solution, and which dyes wool in an acid bath yellow tints turning to brownish-yellow, when subsequently chromated.

In witness whereof I have hereunto signed my name this 16 day of August, 1917, in the presence of two subscribing witnesses.

EMIL REBER.

Witnesses:
  H. H. DICK,
  AMAND BRAUN.